(12) United States Patent
Pihlaja et al.

(10) Patent No.: US 8,897,715 B2
(45) Date of Patent: Nov. 25, 2014

(54) COGNITIVE RADIO

(75) Inventors: Juha Pihlaja, Helsinki (FI); Anu Huttunen, Helsinki (FI)

(73) Assignee: Nokia Corporation, Espoo (FI)

(*) Notice: Subject to any disclaimer, the term of this patent is extended or adjusted under 35 U.S.C. 154(b) by 561 days.

(21) Appl. No.: 13/146,892

(22) PCT Filed: Jan. 28, 2009

(86) PCT No.: PCT/FI2009/050066
§ 371 (c)(1),
(2), (4) Date: Oct. 11, 2011

(87) PCT Pub. No.: WO2010/086487
PCT Pub. Date: Aug. 5, 2010

(65) Prior Publication Data
US 2012/0129462 A1    May 24, 2012

(51) Int. Cl.
*H04B 17/00* (2006.01)
*H04W 16/14* (2009.01)
*H04W 24/10* (2009.01)

(52) U.S. Cl.
CPC ............ *H04W 16/14* (2013.01); *H04W 24/10* (2013.01)
USPC ........................................ 455/67.11; 455/62

(58) Field of Classification Search
CPC ................................ H04B 17/00; H04W 24/00
USPC .......................... 455/67.11, 62; 370/462, 310
See application file for complete search history.

(56) References Cited

U.S. PATENT DOCUMENTS

| 8,208,873 | B2* | 6/2012 | Seidel et al. ................. 455/126 |
| 2008/0089306 | A1* | 4/2008 | Hu ............................... 370/342 |
| 2008/0171552 | A1* | 7/2008 | Hyon et al. ................... 455/450 |
| 2008/0233991 | A1 | 9/2008 | Gillig et al. |
| 2008/0317062 | A1* | 12/2008 | Timmers et al. .............. 370/462 |
| 2009/0310724 | A1* | 12/2009 | Shah et al. .................... 375/346 |
| 2009/0312043 | A1* | 12/2009 | Shah et al. .................... 455/501 |
| 2009/0313524 | A1* | 12/2009 | Choi et al. .................... 714/752 |

FOREIGN PATENT DOCUMENTS

| CN | 1972495 A | 5/2007 |
| GB | 2447148 A | 9/2008 |
| WO | 2008086243 A1 | 7/2008 |

OTHER PUBLICATIONS

Office Action received for corresponding Chinese Application No. 200980155566.9 dated Jul. 3, 2013, 7 pages.
International Search Report and Written Opinion of the International Searching Authority for corresponding Patent Cooperation Treaty Application No. PCT/FI2009/050066 dated Oct. 27, 2009, 16 pages.
Jing et al., "Spectrum Co-Existence of IEEE 802.11b and 802.16a networks using the CSCC etiquette protocol," 2005 First IEEE International Symposium on New Frontiers in Dynamic Spectrum Access Network, Baltimore, MD, USA, Nov. 8-11, 2005, pp. 243-250.

(Continued)

*Primary Examiner* — April G Gonzales
(74) *Attorney, Agent, or Firm* — Mintz, Levin, Cohn, Ferris, Glovsky & Popeo, P.C.

(57) ABSTRACT

An apparatus configured to operate under cognitive radio principles. The apparatus includes a processor configured to perform spectrum sensing in the apparatus to produce spectrum sensing data; and first circuitry configured to share the spectrum sensing data with other apparata.

16 Claims, 6 Drawing Sheets

(56) References Cited

OTHER PUBLICATIONS

Berlemann et al., "Cognitive radio and management of spectrum and radio resources in reconfigurable networks", Wireless World Research Forum, Working group 6 white paper, Available online 2007 (retrieved on Oct. 20, 2009) www.wireless-world-research.org/fileadmin/sites/default/files/about_the_forum/WG/WG6/white%20paper/WG6_WP7.pdf.

Lunden et al., "Censoring for collaborative spectrum sensing in cognitive radios", Forty-first Asilomar Conference on Signals, Systems, and Computers, Pacific Grove, CA, USA, Nov. 4-7, 2007, pp. 772-776.

End-to-End Efficiency (E3): an integrated project of the 7th framework programme of the European Commission Technical Highlights. Available online 2009 (retrieved Oct. 20, 2009) ict-e3.eu/project/technical_highlights/technical_highlights.html.

Holland et al., "A Universal Resource Awareness Channel for Cognitive Radio", The 17th Annual IEEE International Symposium on Personal, Indoor and Mobile Radio Communications (PIMRC'06), 2006 IEEE.

Jing et al., "Spectrum Co-existent of IEEE 802.11b and 802.11a Networks Using the CSCC Etiquette Protocol", *Proceedings of IEEE DySPAN* (*International Symposium on New Frontiers in Dynamic Spectrum Access Networks*), pp. 243-250, Baltimore, MD, Nov. 8-11, 2005.

\* cited by examiner

Node of network A

Node of network B

CCR path

COGNITIVE RADIO

RELATED APPLICATION

This application was originally filed as PCT Application No. PCT/FI2009/050066, filed Jan. 28, 2009.

TECHNICAL FIELD

The present invention generally relates to cognitive radio systems. The invention relates particularly, though not exclusively, to control information used in cognitive radio systems.

BACKGROUND ART

Cognitive radio is a form of wireless communication in which radios alter the radio resources they use based on local radio network conditions. Radio resources with a locally low utilization ratio are identified and taken into use. That is, a transceiver can detect which communication channels are in use and which are not, and use the vacant channels while avoiding occupied ones. In this way better spectrum efficiency can be achieved as compared to static allocation of channels.

One of the technical solutions needed for cognitive radio is how to identify the local radio network conditions. For example, in order to support hierarchical primary-secondary spectrum usage scenarios, cognitive radios should be able to detect a primary (legacy) user at a low power level and avoid causing interference to it. Spectrum sensing is a basic functionality used for detecting local radio network conditions. Spectrum sensing can be used for detecting primary users and finding unoccupied or underutilized spectrum. Also, spectrum sensing can be used to measure utilization degree and dynamics of frequency bands of interest.

Oliver Holland, Alireza Attar, Nikolas Olaziregi, Nima Sattari, and A. Hamid Aghvami, "A Universal Resource Awareness Channel for Cognitive Radio", the 17th Annual IEEE International Symposium on Personal, Indoor and Mobile Radio Communications (PIMRC'06) proposes a concept of a universally available Resource Awareness Channel for conveying information about resource usage for cognitive radio. Therein nodes transmit over a dedicated channel information about the resources that are used by the traffic that they are receiving. Other nodes then listen to this channel and thereby receive information about interference conditions in the system.

US20080171552 provides a communication method for a distributed network system where cognitive radio technology is used.

SUMMARY

According to a first example aspect of the invention there is provided an apparatus, comprising:
a processor configured to perform spectrum sensing in the apparatus to produce spectrum sensing data; and
first circuitry configured to share the spectrum sensing data with other apparata.

In an embodiment the apparatus of the first example aspect is an end user apparatus. Also the other apparata may be end user apparata.

In another embodiment the apparatus of the first example aspect and the other apparata are mobile apparata.

In an embodiment
the processor is configured to detect a low density of nodes; and
the first circuitry is configured to perform said sharing responsive to said detection of a low density of nodes.

In an embodiment the processor is configured to perform said detection of a low density of nodes on the basis of monitoring messages sent by other apparata.

In an embodiment the processor is configured to perform said detection of a low density of nodes by
detecting number of one-hop neighbour nodes; and
responsive to said number of one-hop neighbour nodes being below a certain value N, concluding detection of a low density of nodes.

In an embodiment the first circuitry is configured to share the spectrum sensing data with apparata of more than one communication system.

In an embodiment the first circuitry is configured to share the spectrum sensing data with a fixed node of another communication system.

In an embodiment the first circuitry is configured to perform said sharing by both sending and receiving spectrum sensing data.

In an embodiment the processor is configured to use the shared spectrum sensing data for finding own network.

In an embodiment the first circuitry is configured to share the spectrum sensing data over a cognitive control channel.

In another embodiment the first circuitry is configured to share the spectrum sensing data along payload data.

In an embodiment the cognitive radio operates on a first radio access principle, and the first circuitry is configured to share the spectrum sensing data over a cognitive control channel, the cognitive control channel operating on a second radio access principle.

According to a second example aspect of the invention there is provided a method comprising
performing spectrum sensing in an apparatus to produce spectrum sensing data, the apparatus being configured to operate under cognitive radio principles; and sharing the spectrum sensing data with other apparata.

According to a third example aspect of the invention there is provided a computer program executable in an apparatus, the computer program comprising
program code for performing spectrum sensing in the apparatus to produce spectrum sensing data, the apparatus being configured to operate under cognitive radio principles; and
program code for sharing the spectrum sensing data with other apparata.

The computer program may be stored on a computer readable medium.

Various example embodiments of the present invention are illustrated hereinafter in the detailed description of the invention as well as in the dependent claims appended hereto. The embodiments are illustrated with reference to selected aspects of the invention. A person skilled in the art appreciates that any embodiment of the invention may be combined with other embodiment(s) within the same aspect. Furthermore, any embodiment may apply to other aspects as well either alone or in combination with other embodiment(s).

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
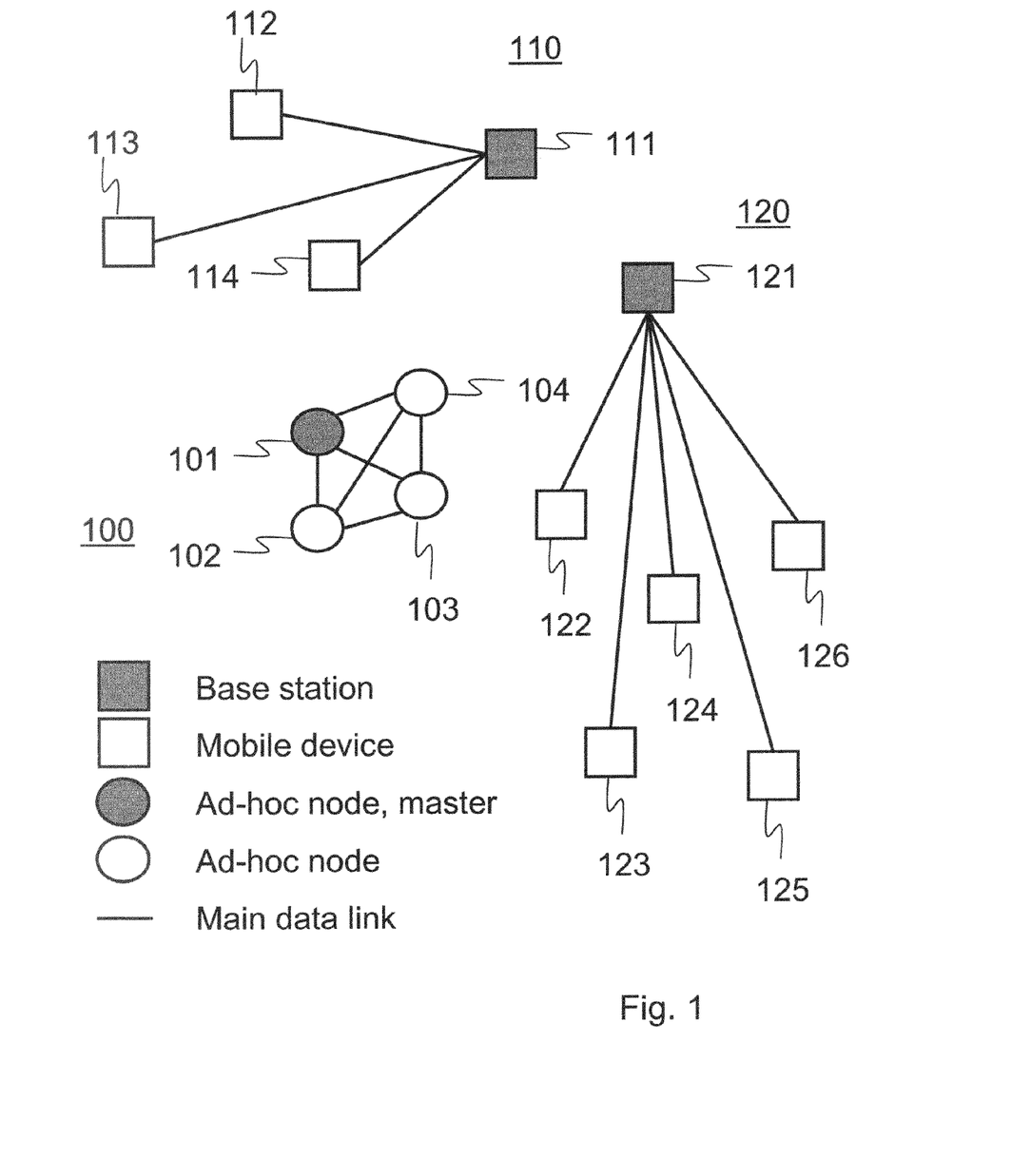
FIG. 1 shows a schematic picture of an example system.

FIG. 1 shows a schematic picture of an example system in which certain embodiments of the invention may be applied. Therein different types of cognitive networks share a limited band of spectrum in the same geographical area. The example system comprises two access networks 110 and 120 and an ad-hoc network 100 operating in the same local area. The ad-hoc network comprises nodes 101-104 of which the node 101 is a master node. The access networks 110 and 120 comprise base stations 111 and 121 and mobile devices 112-114 and 122-126, respectively. Solid lines between nodes and/or base stations illustrate main data links of the networks. The invention is not limited to ad hoc networks comprising at least one master node.

The nodes of the cognitive networks 100, 110 and 120 have spectrum sensors for measuring spectrum usage in the operating area and level of activity of nearby nodes in the operating area. The cognitive networks are secondary networks in the sense that they need to sense the presence of primary or licensed user signals in the area and their spectrum usage. Additionally, the cognitive networks may be configured to sense other cognitive networks operating on equal priority in the same area in order to be able to share the available spectrum on fair basis.

In an embodiment, nodes of a cognitive network produce spectrum sensing data and share the data with other nodes of the cognitive radio network, between different types of networks and/or between nodes of different types of networks. In this way one may contribute to collaborative spectrum sensing. In an embodiment, the sensing data is shared among multiple radio access technologies (multi-RAT).

Collaborative spectrum sensing can be used for enhancing the spectrum sensing task. In collaborative sensing, many nodes can analyze same part of the spectrum simultaneously resulting in an enhanced detection probability of low level signals when the results are combined or merged. Similarly or alternatively, each individual node can sense a smaller part of the spectrum at a given time. This allows use of simpler and more power efficient spectrum sensing techniques. By using collaboration among nodes, one can also avoid the so called hidden node problem where a primary user cannot be detected by a single node only because of channel propagation effects such as shadowing or fading. The effects of propagation can be mitigated when multiple terminals in different locations are used for the spectrum sensing. In an example solution, a transmitting node (either primary/legacy user or another cognitive radio node) is sensed by many neighbours of the transmitting node (i.e. by other nodes located near the transmitting node). The sensing results are then shared among the nodes. The probability of at least one (neighbour) node sensing the transmitting node is usually high since different nodes may sense during different times and diversity can be gained by multiple nodes sensing simultaneously. By sharing actual measurement data (the sensing results) instead of information on channels that have been determined to be in use, it may be possible to detect channel usage by primary or other systems with greater sensitivity, as a channel in use can be determined to be in use despite it not being classifiable as in-use according to sensing data from any single device, but only by combining results from more than one sensing device.

An embodiment of the invention proposes a cognitive control radio (CCR) for communicating cognition related information (for example spectrum sensing related information) between different nodes of cognitive networks. The CCR is a dedicated channel used for sharing the sensing data or other cognitive network related information.

In an embodiment the Medium Access Control protocol (MAC) of the CCR is based on random access. The CCR may be targeted to operate with very low power consumption. Depending on the implementation, also an infrastructure path can be used within CCR, if the geographical distance between the endpoints of the path is short.

In an embodiment, the CCR is realized as a multi-hop network. Multi-hop broadcast may be implemented using the so called flooding algorithm. In flooding algorithm each packet is identifiable using a combination of sender's address and a serial number inserted by the sender to the packet. In the flooding algorithm a node retransmits a received packet, if it has not done so earlier. A packet may include a hop count, which is decremented by one by each node retransmitting the packet. When the hop count reaches zero, the retransmission is ceased. The presence of the hop count field effectively allows the multi-hop network to be of arbitrary large size. Multi-hop unicast transmission may require the creation of a route from the source node to the destination node. In mobile environment the creation and keeping up routes requires transmission of route finding messages.

In another embodiment, the CCR is realized as a network supporting single-hop transmissions. An advantage of using a single-hop transmissions is that it consumes less radio resources than multi-hop transmission.

Figure 2:
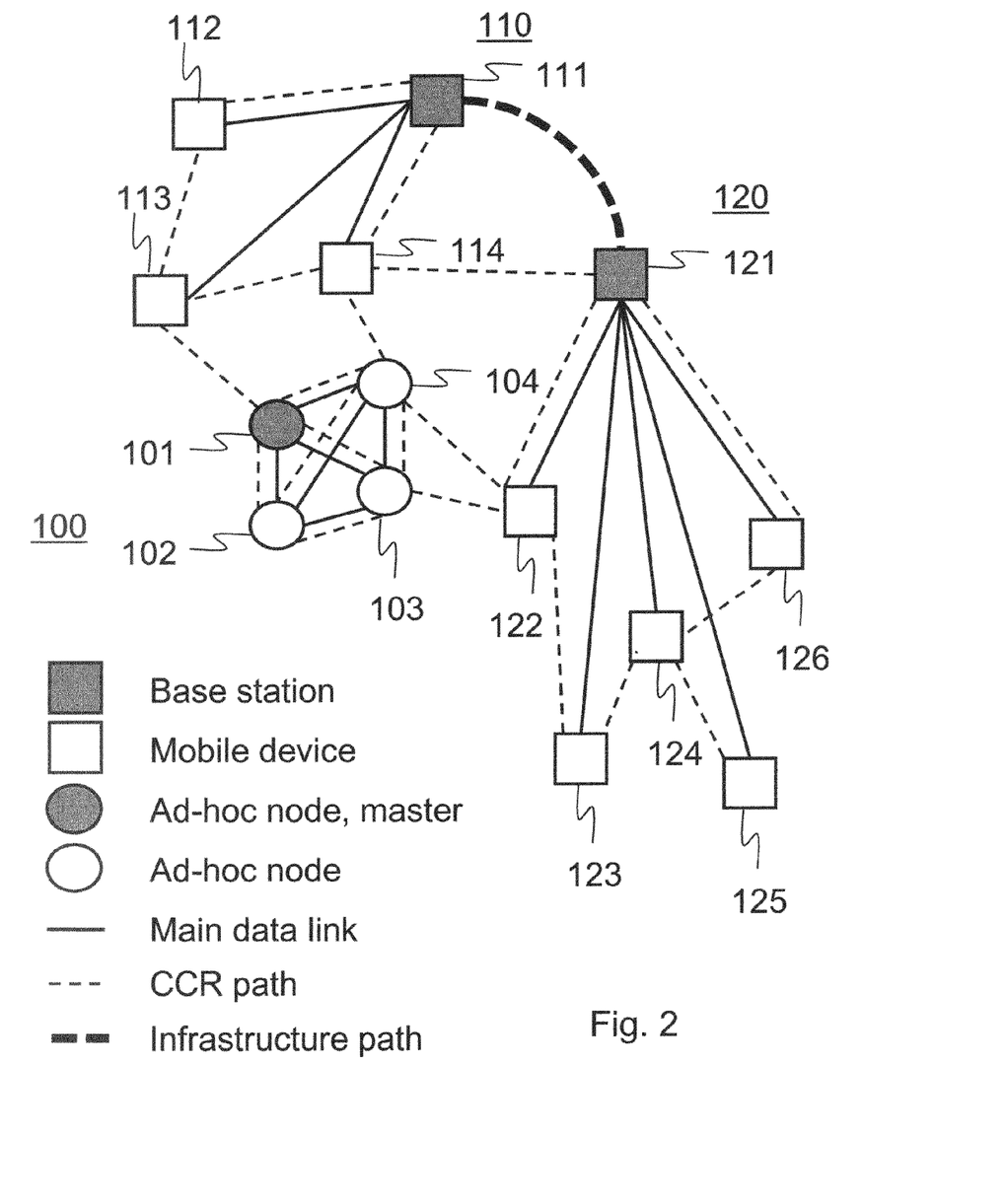
FIG. 2 shows a schematic picture of an example cognitive control radio.

FIG. 2 shows a schematic picture of an example cognitive control radio. Therein the CCR in accordance with an embodiment of the invention is applied to the network of FIG. 1. The CCR paths of the system are shown with dashed lines between the nodes. All nodes share sensing data with their closest neighbours. I.e. there is a CCR path between a node and the nodes that are located nearby that node.

For example, the node 104 of the cognitive network 100 shares sensing data over the CCR with the nodes 101, 102 and 103 of the cognitive network 100 as well as with the node 122 of network 120 and with the node 114 of network 110. Similarly, the node 113 of network 110 shares sensing data over the CCR with the nodes 112 and 114 of network 110 as well as with the node 101 of the cognitive network 100.

Figure 3:
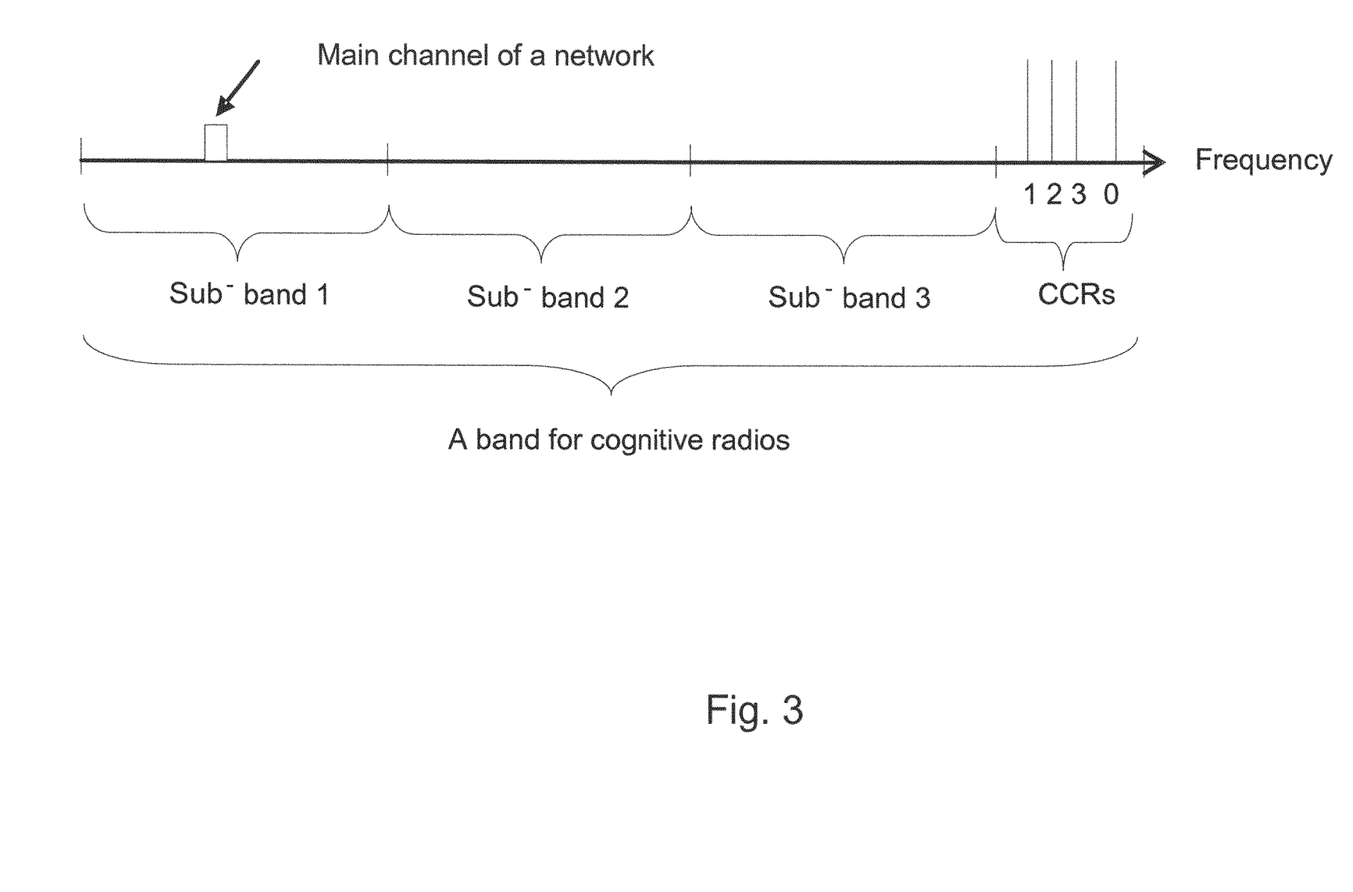
FIG. 3 shows an example frequency plan.

In an embodiment the CCR operates on a known frequency. FIG. 3 shows an example frequency plan for the CCR. There, CCR0 is associated with the whole band of cognitive radios, CCR1 is associated with a sub-band 1, CCR2 is associated with a sub-band 2, and CCR3 is associated with a sub-band 3. Alternatively, the frequencies of the CCR1, CCR2, and CCR3 can be in the sub-band they are associated with. In an embodiment, each node operating on a sub-band x has a CCR operating on the associated frequency (CCRx) for sharing of cognition control information (e.g. spectrum sensing data). Some nodes may have CCR0 in addition to a CCR tuned to one of the frequencies of CCR1-CCR3.

The spectrum band allowed for cognitive radio operation can be wide compared to the actual operating frequency channel. Thus, a node of a cognitive network may waste power and time when trying to find a frequency channel of the network to connect to, if it needs to scan the allowed spectrum band in full. In an embodiment of the invention, the CCR is used for assisting a newly deployed node to find its network. With reference to FIG. 3, in an example solution, those networks, which implement CCR0, send over CCR0 information about networks' operator, type and frequency (covering all sub-bands). The same is done over CCR1-CCR3 regarding the sub-bands 1-3, respectively. A newly deployed node may then find its network by listening to the information sent over the CCRs. The information sent over CCRs is local, so the newly deployed node does not need a geolocation function (e.g. GPS). In this way the node may find its network in a power efficient manner. Also time may be saved in finding the own network in this manner.

Figure 4A:
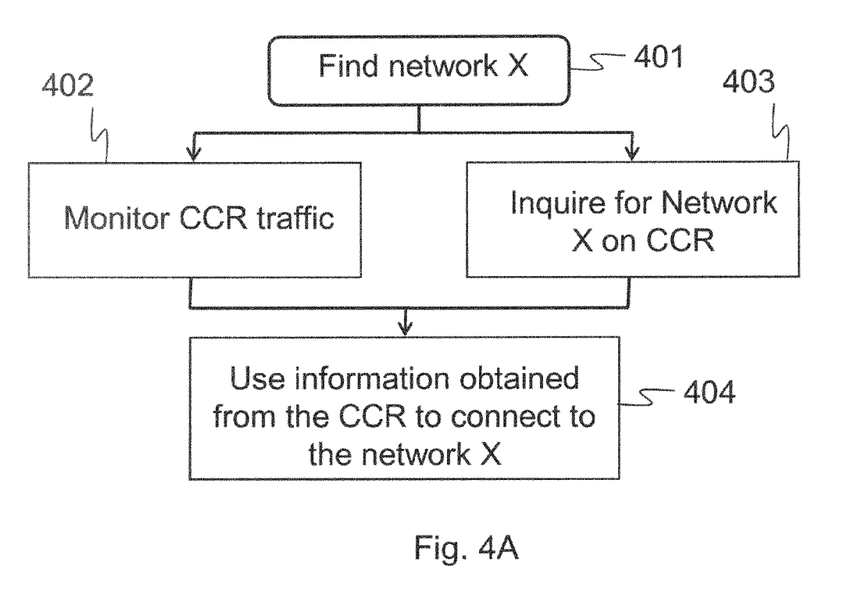
FIG. 4A shows a process of finding a network in accordance with certain embodiments.

With reference to FIG. 4A, a newly deployed node could operate as follows for finding its network. At first the node tunes its CCR to the frequency of CCR0. Those nodes supporting CCR0, for example the base stations of access networks may transmit over one hop of CCR0 information of the frequencies of their RATs (Radio Access Technologies). The newly deployed node may receive those transmissions and in this way find the frequency of its preferred network. This option is illustrated in FIG. 4A in steps 401, 402 and 404. Alternatively, the newly deployed node may send a message on the CCR0, which message is effectively a question "Is network X here?". If a node of the network X supporting CCR0 receives the question, it replies "Network X is operating on frequency Y using parameters and policies Z". This option is illustrated in FIG. 4A in steps 401, 403 and 404. If the newly deployed node does not find its preferred network via CCR0, it tunes its CCR to CCR1 and repeats the above procedure. In case of negative outcome, it searches its preferred network via CCR2 and these cycles may continue to the last CCR (in this example CCR3).

In certain embodiments the CCR may operate on a different radio access principle than the rest of the cognitive radio network, for example the CCR may operate using code division multiple access (CDMA) and the rest of the cognitive network with time division multiple access (TDMA). Also orthogonal frequency division multiple access (OFDMA) may be used for the CCR and/or rest of the cognitive network.

In an embodiment, nodes of cognitive radio networks inform other nodes of the spectrum sensing strategy they are using and the information they have gathered via spectrum sensing. The information that is shared may include information about the frequencies and times of sensing, and the types of algorithms used as well as the sensing results. The sharing may be done over the CCR. The other nodes may be nodes of the same cognitive network or any nearby nodes, i.e. nodes of different networks.

In an alternative embodiment sensing data is shared along payload data instead of using the CCR. More specifically, if the nodes sharing sensing information are in communication with each other for transmission of payload data, they may instead of using the CCR send the information to be shared along the same transmission path as the payload data.

In an embodiment the sharing of spectrum sensing results is done using Sensing Messages. A node may broadcast a Sensing Message over the cognitive control radio (CCR) to its one-hop neighbours on the CCR. In an example solution, the Sensing Message comprises one or more of the following information of the type of sensing results, the sensing results, time stamps related to the sensing results, a request bit, and other required control information.

In an embodiment the content of a Sensing Message is the following:
Type of the message (Sensing Message)
Request bit
   if "1", the receiver is requested to send sensing results
Optional content:
  1. List of
    sensing time stamps
    detected signal types and signal power values and/or detection results such as likelihood ratios per frequency channel
  2. List of
    sensing time stamps
    binary signal detected/not detected values and signal types, if signal is detected, local/wide-area decision base, per frequency channel The first (number 1.) optional content can be used in such a scenario where the different networks are using the same spectrum sensing algorithms. Then the results from other networks can be straightforwardly used in collaborative sensing as if they were acquired from own network. For example, local likelihood ratios calculated by a detection algorithm can be combined together to attain improved detection performance. However, the different networks might be using different sets of algorithms for spectrum sensing. Then the second (number 2.) option can be used. The binary (detected/not detected) result can be shared with other networks. Regardless of the algorithm, a node can add received sensing results to its history database based on which the spectrum availability/unavailability is decided. There, one may want to take into account whether the binary result was calculated by a single network node or whether it is a collaborative result of a large network of nodes. The latter is typically a more reliable result.

Other possible content of a Sensing Message includes signal-to-noise ratios detected in channels. In this context, "channel" may in addition to a frequency channel be a spreading code in a CDMA-type network, wherein the sensing data indicates likelihoods that a certain spreading code is in use.

In an embodiment, when a node receives a Sensing Message with the request bit set, it broadcasts a Sensing Message over the CCR to its one-hop neighbours, provided it has not broadcasted a Sensing Message recently. In this way, nodes may obtain sensing data from other nodes by sending out a Sensing Message with the request bit set. In an example, a node receiving sensing results may compress the received results and sends the possibly compressed result to a fusion center of its own network (or the like network entity) for further processing. When the node is sending the compressed results to the fusion center of its own network, it may use its own network, i.e. not the CCR.

When a cognitive radio network has sparse node density, collaborative spectrum sensing inside the network may result in poor spectral knowledge. The few nodes of the network may not be able to efficiently perform the spectrum sensing task. For example the sensing performed by a single node of a network is limited by the power consumption restrictions. Thus, a cognitive radio network with sparse node density might not have enough information to function optimally. Also, simultaneous operation of other cognitive radio networks in the same area might be degenerated due to non-optimal operation of one network in the same area. In an embodiment of the invention, a sparse cognitive network (i.e. a cognitive network with a low density of nodes) may acquire information from other networks in the same area in order to get enough information for efficient operation. This may be done using the CCR discussed above. One may share sensing results over the CCR between all networks of a certain local area to contribute to the spectral pictures generated in all networks of that local area. In this way spectrum sensing can be made more reliable for sparse cognitive networks.

Figure 4B:
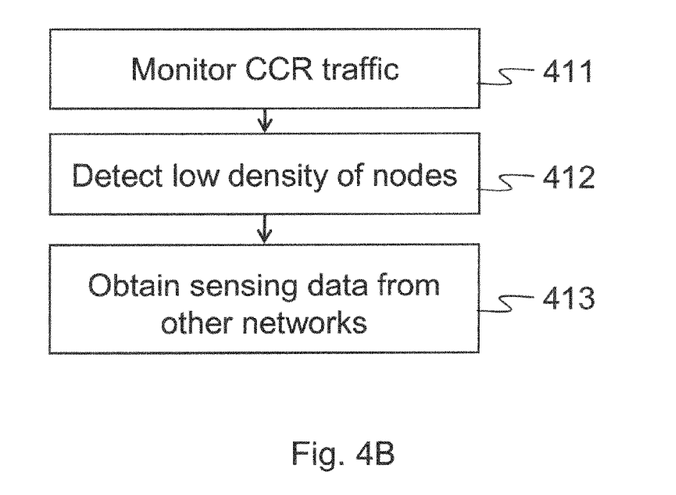
FIG. 4B shows a process of sharing sensing data in accordance with certain embodiments.

In an embodiment, a node shares spectrum sensing results with nodes of other networks, if it has detected a locally low node density situation of its own network nodes. Sharing of the spectrum sensing results may be effected using the Sensing Message discussed above. As an example, a node can detect the locally low node density situation by monitoring traffic on the CCR. Such process is illustrated in FIG. 4B in which the CCR is monitored in step 411. Each node should send a keep-alive message or another message within a certain time interval to the CCR. The messages should have information that identifies the network the sender node belongs to. Thus each node will be able to detect the number its one-hop neighbours belonging to its own network based on the traffic on the CCR. If the number of one-hop neighbours is below a certain value N, the node may conclude that it has detected a locally low node density situation, step 412 of FIG. 4B. Responsive to concluding a locally low density of nodes, the node obtains sensing data from other networks through the CCR, step 413. Obtaining the sensing data may be performed for example by sending out a Sensing Message with a request bit set, whereby other nodes respond with sensing data.

In certain embodiments, a node shares spectrum sensing results over the CCR periodically and/or asynchronously.

In periodical sharing of spectrum sensing results a node has for example a P-timer, which periodically gives a time instant for broadcasting a Sensing Message. The node then broadcasts a Sensing Message, when its P-timer expires. The P-timers of different nodes may be synchronized, which means that the P-timers of different nodes expire almost simultaneously. A node may synchronize its P-timer for example when it receives the Sensing Message assuming that its P-timer has not expired recently. Alternatively, the Sensing Message may comprise a P-timestamp derived from the P-timer for synchronizing purpose. The P-timestamp can be used like the Timestamp field of the Beacon frame in IEEE (Institute of Electrical and Electronics Engineers) 802.11 standard for WLAN (Wireless Local Area Network) or in some other suitable ways.

In asynchronous sharing of spectrum sensing results, a node broadcasts a Sensing Message for example when it has detected a significant change in spectral situation. Asynchronously sent Sensing Message may contain a P-timestamp, which is derived from the P-timer. A receiving node may synchronize its P-timer based on the received P-timestamp.

Figure 5:
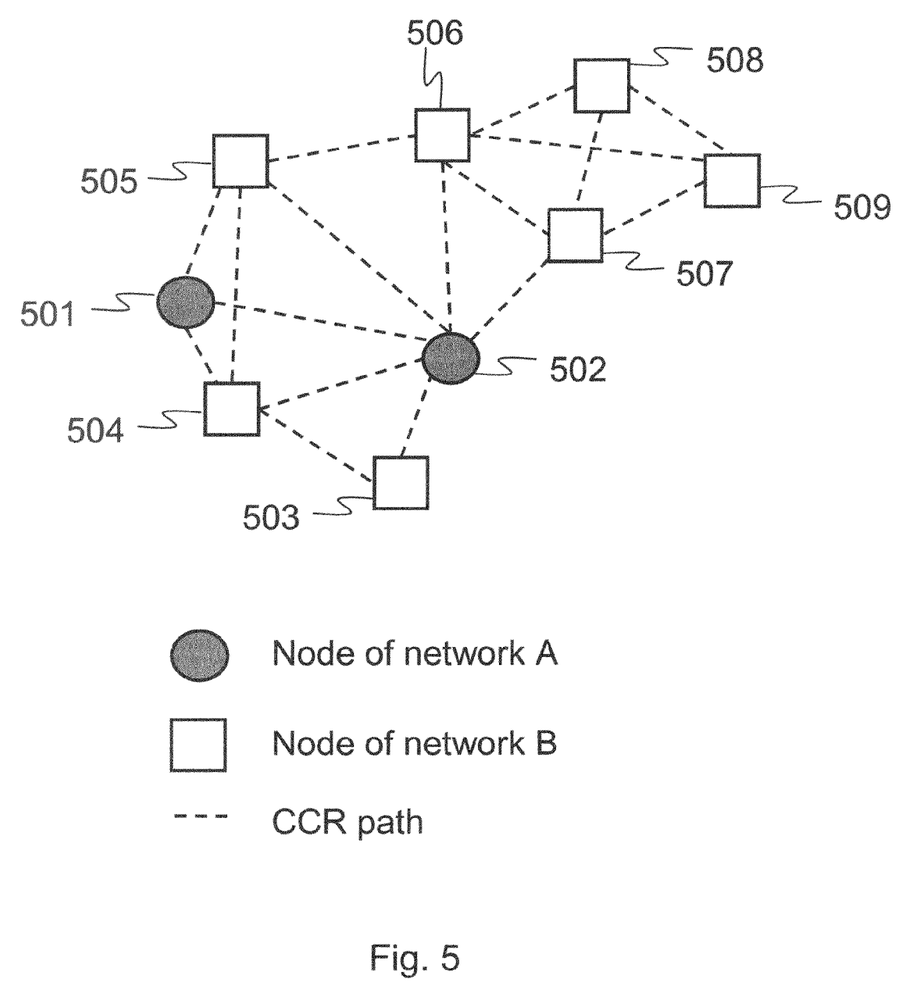
FIG. 5 shows an example usage scenario.

FIG. 5 shows an example usage scenario relating to locally low density of nodes. The Figure shows nodes of network A (grey circles) 501-502 and nodes of network B (white rectangles) 503-509. Only CCR paths (dashed lines) between the nodes are shown in the figure. The main radio links (not shown) between the nodes may have about the same transmission range as the CCR.

Let's now consider an example operation in the scenario of FIG. 5. Let's consider that the number of neighbour nodes N=3 in this example. Node 501 notices that it has only one neighbour node in its own network A and a P-timer of the node 501 expires. Node 501 is the first node that has its P-timer expired in the scenario. Then node 501 broadcasts to its one hop neighbours a Sensing Message with the request bit set. Nodes 502-507 broadcast a Sensing Message as a result of their P-timer expiring or the reception of a Sensing Message with the request bit set. Nodes 502-505 set the request bit, because each of them has less than N one-hop neighbours in their own network. Nodes 506 and 507 have N or more neighbours in their own network and therefore they clear the request bit. Nodes 508 and 509 receive the Sensing Messages from nodes 506 and 507 with the request bit cleared and they have N or more neighbors in their own network. Therefore nodes 508 and 509 do not broadcast a Sensing Message.

In an embodiment the CCR is used for immediate warning of a detected primary user. Once a network node has made a reliable detection of a new primary signal, it immediately broadcast over one or more hops of the CCR information of the type and the frequency of the primary signal. A node receiving this information takes the required measures to free the channel of the primary user. It may for example send the information about the primary user to a fusion center or a decision making node of its own network. In a decentralized network, the node may send an alert to all network nodes, for example by using flooding.

The sharing of spectrum sensing data according to certain embodiments of the invention may enable and/or enhance simultaneous operation of multiple cognitive radio networks in the same local area. One may achieve e.g. efficient channel allocation of several coexisting cognitive networks in the same geographical area.

In certain embodiments of the invention spectrum sensing data is shared directly between mobile devices/nodes of cognitive networks. In this way combining the sensing data can be done in each unit, not only in a base station or other centralized unit.

Figure 6:
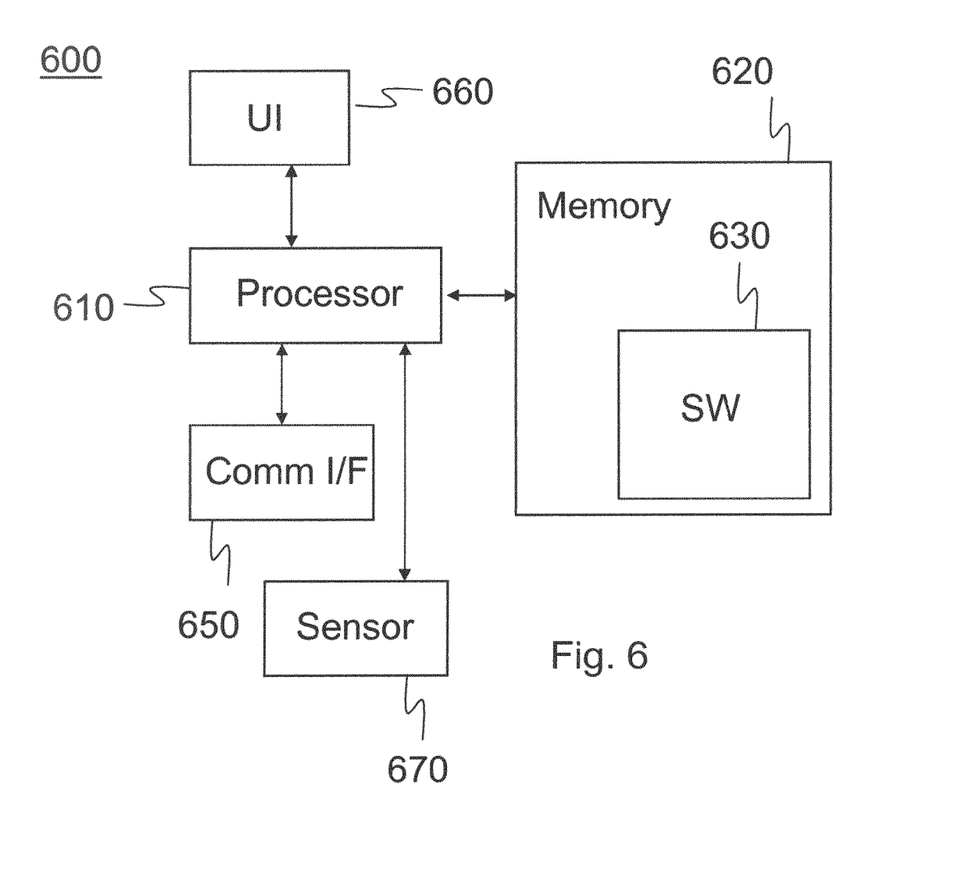
FIG. 6 shows a block diagram of an apparatus in accordance with certain embodiments.

FIG. 6 presents an example block diagram of an apparatus 600 in which various embodiments of the invention may be applied. This may be a user device or apparatus, such as a mobile terminal.

The general structure of the apparatus 600 comprises a communication interface module 650, a processor 610 coupled to the communication interface module 650, and a memory 620 coupled to the processor 610. The apparatus further comprises software 630 stored in the memory 620 and operable to be loaded into and executed in the processor 610. The software 630 may comprise one or more software modules and can be in the form of a computer program product. The apparatus 600 further comprises a user interface controller 660 coupled to the processor 610. Still further there is a sensor module 670 coupled to the processor 610.

The communication interface module 650 may be, e.g., a radio interface module, such as a WLAN, Bluetooth, GSM/GPRS, CDMA, or WCDMA radio module. The communication interface module 650 may be integrated into the apparatus 600 or into an adapter, card or the like that may be inserted into a suitable slot or port of the apparatus 600. The communication interface module 650 may support one radio interface technology or a plurality of technologies. FIG. 6 shows one communication interface module 650, but the apparatus 600 may comprise a plurality of communication interface modules 650.

The processor 610 may be, e.g., a central processing unit (CPU), a microprocessor, a digital signal processor (DSP), a graphics processing unit, or the like. FIG. 6 shows one processor 610, but the apparatus 600 may comprise a plurality of processors.

The processor 610 and the communication interface module 650 may be configured to implement a CCR according to certain embodiments of the invention.

The memory 620 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 600 may comprise a plurality of memories. The memory 620 may be constructed as a part of the apparatus 600 or it may be inserted into a slot, port, or the like of the apparatus 600 by a user. The memory 620 may serve the sole purpose of storing data, or it may be constructed as a part of an apparatus serving other purposes, such as processing data.

The user interface controller 660 may comprise circuitry for receiving input from a user of the apparatus 600, e.g., via a keyboard, graphical user interface shown on the display of the apparatus 600, speech recognition circuitry, or an accessory device, such as a headset, and for providing output to the user via, e.g., a graphical user interface or a loudspeaker.

The sensor module 670 may be e.g. a spectrum sensor module configured to produce spectrum sensing data.

A skilled person appreciates that in addition to the elements shown in FIG. 6, the apparatus 600 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 600 may comprise a disposable or rechargeable battery (not shown) for powering the apparatus 600 when external power if external power supply is not available.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description should be considered as merely illustrative of the principles of the present invention, and not in limitation thereof. Hence, the scope of the invention is only restricted by the appended patent claims.

The work leading to this invention has received funding from the European Community's Seventh Framework Programme FP7/2007-2013 under grant agreement n° 216248.

The invention claimed is:

1. An apparatus comprising:
   at least one processor; and
   at least one memory including computer program code, the at least one processor, the at least one memory, and the computer program code causing the apparatus to at least:
   produce spectrum data representative of a utilization of a frequency spectrum; and
   send, via a cognitive radio control channel operating in accordance with a second radio access technology, the spectrum data to one or more mobile devices,
   wherein the apparatus is a cognitive radio operating in accordance with a first radio access technology.

2. An apparatus according to claim 1, wherein the apparatus is further caused to determine a density of mobile devices, and wherein when the apparatus determines a low density of mobile devices, the apparatus is further caused to send the spectrum data to the one or more mobile devices.

3. An apparatus according to claim 2, wherein the apparatus determines the low density of mobile devices by monitoring messages sent by the one or more mobile devices.

4. An apparatus according to claim 2, wherein the apparatus determines the low density of mobile devices by detecting a number of one-hop neighbor nodes, and wherein when the number of one-hop neighbor nodes is below a predetermined value, suspending the detecting.

5. An apparatus according to claim 1, wherein the apparatus is further caused to send the spectrum data to a fixed node of another communication system.

6. An apparatus according to claim 1, wherein the apparatus is further caused to receive at least some spectrum data from at least one mobile device.

7. An apparatus according to claim 1, wherein the apparatus is further caused to determine, from at least the spectrum data, a network operating according to the first radio access technology.

8. An apparatus according to claim 1, wherein the apparatus is further caused to send the spectrum data via the first radio access technology.

9. A method comprising:
   producing, by a cognitive radio operating in accordance with a first radio access technology, spectrum data representative of a utilization of a frequency spectrum; and
   sending, via a cognitive radio control channel operating in accordance with a second radio access technology, the spectrum data to one or more mobile devices.

10. A method according to claim 9, further comprising determining a density of mobile devices, wherein when the density of mobile devices is low, the apparatus sends the spectrum data to the one or more mobile devices.

11. A method according to claim 10, wherein the determining the density of mobile devices is low depends on a monitoring of the messages sent by the one or more mobile devices.

12. A method according to claim 10, further comprising:
   sending the spectrum data to a fixed node of another communication system.

13. A method according to claim 9, further comprising:
   receiving further spectrum data from at least one mobile device.

14. A method according to claim 9, further comprising:
   determining, from at least the spectrum data, a network operating according to the first radio access technology.

15. A method according to claim 9, further comprising:
   sending the spectrum data via the first radio access technology.

16. A non-transitory computer-readable medium encoded with instructions that, when executed by at least one processor, causes operations comprising:
   producing, by a cognitive radio operating in accordance with a first radio access technology, spectrum data representative of a utilization of a frequency spectrum; and
   sending, via a cognitive radio control channel operating in accordance with a second radio access technology, the spectrum data to one or more mobile devices.

* * * * *